UNITED STATES PATENT OFFICE.

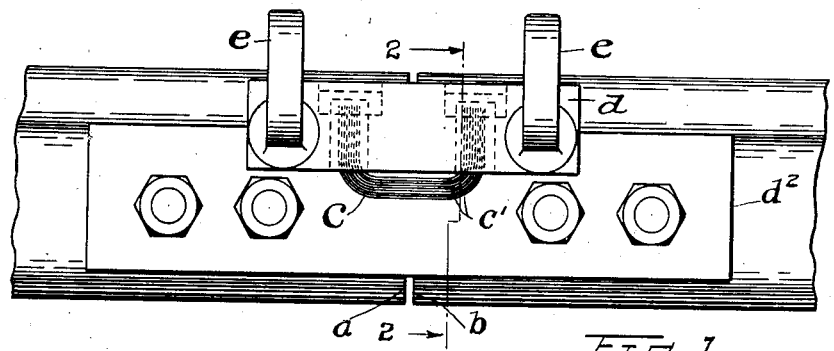
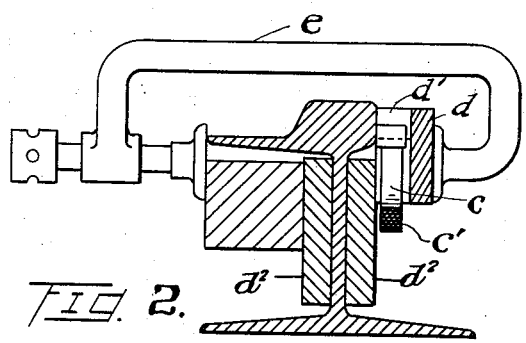
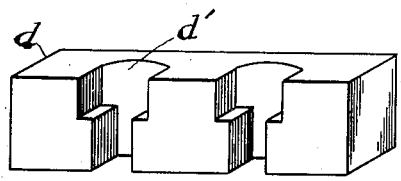
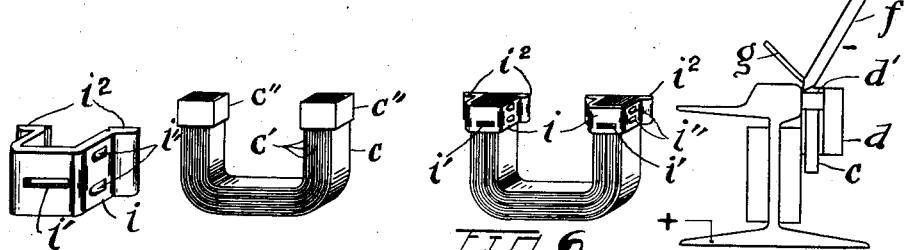
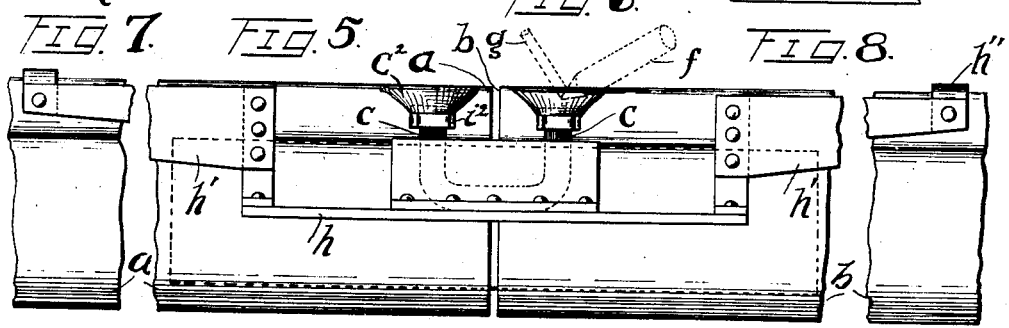

JOHN C. LINCOLN, OF CLEVELAND, OHIO.

METHOD OF BONDING RAILWAY-RAILS.

1,183,993.      Specification of Letters Patent.      Patented May 23, 1916.

Application filed March 13, 1916. Serial No. 83,996.

*To all whom it may concern:*

Be it known that I, JOHN C. LINCOLN, a citizen of the United States of America, residing at Cleveland, in the county of Cuyahoga and State of Ohio, have invented certain new and useful Improvements in Methods of Bonding Railway-Rails, of which the following is a specification.

My invention relates to an improved method of electrically bonding rail-ends, and has for its object, the provision of a simple, cheap and efficient method for bonding railway rails. My said improvement contemplates the sectional fusion, in position, of a suitable electrical bond, in connection with the respective rail-ends, and ordinarily supplying to the bond at the time of fusion, sufficient conductive material to insure adequate electrical conductivity between the rails and the terminals of the bond. Preferably, the electrical bond comprises superposed strips or laminæ of copper, which are united in U-shaped form with their ends each embraced respectively within a three-sided clamp, mechanically attached thereto, which clamp affords of itself, extended contact surfaces, while bringing the edges of the laminæ into intimate electrical contact with the rail-ends, for augmenting the conductivity between the fused members of the electrical joint thus formed. The practice of my invention, ordinarily proceeds in a carbon mold or carbon lined mold, which contains the ends of the rail bond, held closely adjacent to the respective ends of the rails. An electric arc, or other suitable heating means, is employed to cast-weld the bond directly to the body of the rail, and whenever necessary, a sufficient additional amount of the bonding material is cast-welded in position to afford adequate electrical connection with the rails.

This method is described and claimed somewhat specifically, and in more detail, in my application for Patent, Serial Number 783,973, of which this in part is a continuation.

However, it is often desirable and practicable to discard the use of the carbon mold, and attach the bond by fusing the heads thereof to the rail-ends, and by supplying sufficient additional metal in a fused state to the heads of the bonds, so that cast-welding, as I may term it, is not necessary. Under certain conditions, I proceed with the practice of my invention by directing an electric arc against the rail-end and the head of the bond and its terminal clamp, from a non-metallic or carbon negative electrode, until the parts are in a state of fusion, and thereafter the head of the bond may be built up under the influence of the electric arc, by fusing additional copper thereto, and to the rail-end, so that a complete mechanical and electrical union is assured between the parts.

My invention may be more readily explained by making reference to the accompanying drawings, wherein:—

Figure 1 is a side elevation of two rail-ends, illustrating the mold and bond in position thereon. Fig. 2 is a transverse section on line 2—2 of Fig. 1. Fig. 3 is a perspective view of a carbon mold for practising my invention. Fig. 4 is a fragmentary view in elevation, intermediately broken away, of two rail-ends, a mechanical clamp for holding the bond against said rail-ends, and the bond itself terminally fused to the rail-ends, as last described above. Fig. 5 illustrates the one type of bond. Fig. 6 illustrates the preferred type of electrical bond. Fig. 7 is a perspective view of the terminal clamp therefor, and Fig. 8 is merely a diagrammatic view to indicate the preferred mode of practising my invention.

Throughout the several figures of the drawings, I have employed the same character of reference to indicate similar parts.

In ordinary practice, the operating current for the trolley railway, affords the most accessible source of power, and consequently, the heat requisite for affixing the electrical bond. The usual mode of accomplishing this result previously, has involved the employment of a rotary converter for generating alternating currents of high amperage and directly heating the bonding and brazing material by the passage of such currents, to effect a braze upon the rail-ends and insure their electrical union. My invention proceeds along the lines of highly heating both the steel of the rail-ends and the bond to secure surface fusion therebetween; preferably by the arc of a direct current circuit from any convenient or suitable source, such as the trolley circuit or a rotary converter, whereby approximately ten per cent. of the electric energy required by the former method will serve to effect a cast-weld within a suitable mold. In the present method, the flow of current through the bond and rail is only incidental to one mode of practising my invention simply for the purpose of producing the fusion by means of the electric arc. This comprises the more usual method employed. Accordingly, I will describe my improvement, as practised in the manner just outlined.

Referring to the drawings, $a$, $b$, are the ends of the rails which are to be electrically united. Adjacent to the outer heads thereof, and bridging the slight interval between the rails, there is positioned an electric bond $c$, formed of copper laminæ $c'$, with their ends bent to U-shape and connected by encircling bands $c''$, as best shown in Fig. 5. The rails, it will be understood, are mechanically united, as by the fish-plates $d^2$, as shown in Figs. 1 and 2, and by the dotted lines Fig. 4.

A carbon mold $d$ is secured to the rail ends by means of clamps $e$. This mold is provided with expanded, bottomless recesses $d'$, which are adapted to receive the ends of the copper bonds, while protecting the body thereof against excessive heat, as shown in the drawings.

It will be understood that my invention is neither restricted to the details of means nor manner for practising the same. However, I may explain that the bond may be formed of copper strips varying in thickness from 1/64" to 1/32", and in width from 1/4" to 1/2". The ends of the laminæ may be united by a copper band of 1/2" in width, and when the bond is inserted within the recesses of the mold, these banded ends project from 1/16" to 3/16" above the bottom walls of the expanded portions. Referring to the diagram, Fig. 8, the carbon $f$ or — pole should be understood to be in connection with the trolley conductor, or other source of current, through the resistance $f'$. The current ordinarily used, varies from one hundred to two hundred amperes, depending upon the size of the bond and the rapidity with which it is desired to make the weld. The positive electrical connection comprises the electric bond and the rail.

Having adjusted the parts, as described and shown, carbon $f$ is applied to one end of the bond within its recess $d'$ and the electric arc is struck between said carbon and the bond, or the inclosed portion of the rail, serving to fuse the surface of the rail and melt down the copper within the recess of the mold.

The operative is provided with a dark glass screen, wherewith to observe the progress of fusion and the condition of the fused metals. As soon as the end of the rail, the has been thoroughly fused to the rail, the end of a copper rod $g$ may be inserted into the recess $d'$, and sufficient copper may be melted therefrom by the arc and cast-welded to the surface of the rail by the same means, in order to provide an adequate head or conductive connection between the bond and the rail.

In practice it will be found that the copper fused in this manner, often becomes somewhat porous and the operative by watching, is enabled to judge of this condition, and provide a sufficient conductive body or head for the bond to afford adequate electrical connection with the rail. It will also be observed that only a small section of the rail head is subjected to the arc and fused thereby, in connection with the bond and added copper, so that the wearing qualities of the rail are unaffected by the localized heat to which it is subjected.

A single carbon mold preferably is employed for practising my method, since the molten copper tends to occlude oxygen, and the carbon, moreover, maintains the cast-welded metal in a bright and pure condition. Upon breaking one of the cast-welded connections, it will be found that the molten steel and copper have united over a slightly irregular surface, and portions of the steel frequently may be broken away with the copper bond, upon applying sufficient force thereto. Nevertheless, the method of cast-welding these bonds is sufficient to afford permanent electrical and mechanical connection between the rails and bond, throughout the life of the former.

Quite obviously, sufficient heat may be applied to the bond and rail by the oxy-acetylene or the oxy-hydrogen flame, for example, although the negative terminal of the electric arc more commonly is preferable for this purpose. It will be observed that the heating of the bond itself causes early fusion of a small section of each terminal directly upon its associated rail-end, and by adding molten bonding material to form the conductive heads cast-welded upon the bond and rail-ends, said heads are thus fused directly to the terminals of the bond and to the rail-ends, before they have had time to cool appreciably. In other words, the cast-welding operation proceeds from the bottom wall of the expanded recess in the mold, and permits fused metal to be added to the body previously fused therein, and before the latter has cooled sufficiently to permit hardening. In this way, only the surface of the head and the adjacent section of the rail need be maintained in a state of fusion. The bond itself, moreover, is protected from excessive heat, and the laminæ remain unfused for some distance within the jacket, hence any flexing strains are distributed by the closely encircling jacket or sleeve.

While the described method of cast-welding bonds ordinarily is desirable, as previously indicated, I may directly fuse the terminals of the bond to the rail, by means of the negative electrode of the electric arc. For this purpose, the bond $c$, may be clamped directly against the rail-ends, in a suitable clamp, such as shown in Fig. 4, wherein the bracket $h$, is pressed by spring arms $h'$ and its attaching terminals $h''$, to force the heads of the bond against the rail-ends. The negative electrode $f$ is then applied locally to the rail-ends and to the heads of the bond to effect surface fusion, and build up thereon, additional material, as from a copper rod $g$, as before described, until an adequate body of metal $c^2$ is fused or welded directly to the laminæ of the bond and to the rail-ends. By reason of the much higher thermal conductivity of the copper bond, as compared with the rails, it is found in practising my process, that temperatures only sufficient to fuse the steel slowly, will not effect fusion between the steel and copper. This no doubt is due to the excessive thermal conductivity of copper, which apparently radiates or dissipates the heat throughout the body of the bond, unless it is locally and intensively applied to the terminals of the bond.

It may be pointed out that for this purpose, it is practically necessary to employ the negative carbon or other non-metallic electrode, for the reason that the fusing temperatures of the rail-ends, and of the bond, are so different, that a metallic electrode would itself be partly fused in bringing the surfaces of the rail-ends to the requisite temperature, while it is desirable that the workman shall carefully inspect the fusion, and avoid depositing additional metal from the rod $g$, until such time as the laminæ and terminal clamp have themselves been fused to the adjacent portion of the rail-end.

For this purpose, the preferred type of bond shown in Figs. 6 and 7 may be used with much advantage, wherein the edges of the laminæ may be brought directly into individual contact with the rail-ends, which is permitted by the three-sided clamp $i$, punched at the front and sides $i'$, $i''$, to insure a sufficient grip upon the metal, while its base $i^2$, is expanded to provide an additional body of metal, for making contact with and fusing upon the rail-ends.

Having now described my invention as preferably practised, I claim herein as new and desire to secure by Letters Patent, the following:—

1. The herein-described method for applying a bond of relatively higher thermal and electrical conductivity to rail-ends, which consists in positioning a laminated bond with its laminæ individually in engagement with two alined rail-ends, and applying an electric arc locally to the rail-ends and to the bond to secure surface fusion therebetween, substantially as set forth.

2. The herein-described method for applying a bond of relatively higher thermal and electrical conductivity to rail-ends, which consists in securing the bond in position of substantial engagement with two alined rail-ends connected in electric circuit, and applying the negative non-metallic terminal of an electric arc to the rail-ends, and to the bond progressively, in order to effect fusion respectively between said rail-ends and bond, substantially as set forth.

3. The herein-described method for applying a bond of relatively higher thermal and electrical conductivity to rail-ends, which consists in securing the bond in position of substantial engagement with said rail-ends, connected in electric circuit, applying the negative terminal of an electric arc progressively to the rail-ends, and to the bond to produce sufficient heat, locally to effect the fusion respectively between said rail-ends and bond, and adding sufficient conductive material to the fused portions of the bond, during the process of fusion, to insure adequate electrical conductivity between the bonded rail-ends, substantially as set forth.

4. The herein-described method for electrically bonding railway rails with bonds of relatively higher thermal conductivity, which consists in positioning said rails with their ends in alinement, securing a copper bond in position of substantial engagement with said rail-ends, connecting them in electric circuit, applying the non-metallic terminal of an electric arc to the rail-ends, and to the bond progressively to produce sufficient heat locally for effecting fusion and adding additional molten copper to the bond, during the continuance of fusion, to insure adequate electrical conductivity between said rail-ends and the bond, substantially as set forth.

5. The herein-described method for electrically bonding railway rails, with bonds of relatively higher thermal conductivity, which consists in positioning a laminated bond with the laminæ individually engaging abutting rail-ends, connecting said rail-ends and bond in electric circuit, applying the negative terminal of an electric arc in said circuit, progressively and locally to the rail-ends and to the bond to produce fusion of the laminæ and the rail-ends, and adding additional conductive material to the heads of the bond respectively, by fusing the same thereto and to the rail-ends, substantially as set forth.

6. The herein-described method for applying an electric bond of relatively higher thermal and electrical conductivity to rail-ends, which consists in disposing the bond terminals substantially in abutment with the rail-ends, connecting the rails in an electric circuit, applying the negative non-metallic terminal of an electric arc progressively to the rail-ends and to the bond to effect fusion therebetween, and fusing additional conductive material upon the heads of the bond to increase their contact areas, substantially as set forth.

7. The herein described method of fusing copper bonds upon the ends of railway rails, which consists in disposing the bond adjacent to the respective rail ends and intensively and locally fusing the terminals and adjacent portions of the rail ends in an electric arc applied by the negative non-metallic terminal of a direct current circuit as the fusion of the two metals proceeds, and fusing additional copper to the terminals of the bond and to the rail ends.

In testimony whereof I do now affix my signature in the presence of two witnesses.

JOHN C. LINCOLN.

Witnesses:
 FRANK BUBUA,
 ALBERT LYNN LAWRENCE.